United States Patent [19]

Bacskai

[11] 4,156,676

[45] May 29, 1979

[54] HOT MELT ADHESIVES HAVING IMPROVED THERMAL STABILITY

[75] Inventor: Robert Bacskai, Kensington, Calif.

[73] Assignee: Chevron Research Company, San Francisco, Calif.

[21] Appl. No.: 890,169

[22] Filed: Mar. 27, 1978

[51] Int. Cl.² ............................................. C08K 3/36
[52] U.S. Cl. ................................ 260/37 R; 528/354
[58] Field of Search ............... 260/78.3 R, 75 T, 37 R

[56] References Cited

U.S. PATENT DOCUMENTS

| | | | |
|---|---|---|---|
| 2,362,511 | 11/1944 | Teeters | 260/78.3 X |
| 3,047,524 | 7/1962 | Bowman | 260/78.3 R X |
| 3,142,434 | 7/1964 | Chapman | 260/75 T X |

Primary Examiner—Sandra M. Person
Attorney, Agent, or Firm—D. A. Newell; John Stoner, Jr.; A. T. Bertolli

[57] ABSTRACT

The thermal stability of hot melt adhesives comprising a polymer of glycolic acid is significantly improved by incorporating a minor amount of silica in the adhesive composition.

23 Claims, No Drawings

HOT MELT ADHESIVES HAVING IMPROVED THERMAL STABILITY

BACKGROUND OF THE INVENTION

This invention is concerned with hot melt adhesives comprising a polymer or copolymer of glycolic acid. In particular, this invention provides an improved hot melt adhesive comprising a polymer or copolymer of glycolic acid and a minor amount of silica. Such compositions have been found to have unexpectedly good thermal stability.

Glycolic acid is a bi-functional hydroxyacid which can be made by the hydrolysis of cloroacetic acid or by the oxidation of ethylene glycol with dilute nitric acid. Being bi-functional glycolic acid can be polymerized or copolymerized rather easily to form high molecular weight polymers. U.S. Pat. No. 2,676,945 describes glycolic acid polymerization by polycondensation carried out in the solid state at about 220° C. under reduced pressure.

Glycolic acid polymers, at times referred to as either "polyglycolic acid" or "polyglycolides," have a variety of end uses. For instance, being soluble in physiological fluids they have been used as an absorbable suturing material. In order to enhance or modify the physical properties of polyglycolides they have been copolymerized with various other functional compounds. In particular, polybasic acids and polyhydric alcohols have been copolymerized with polyglycolide to form polyesters often referred to as "alkyd resins." In the molten state these resins are usually quite viscous. Accordingly, glycolic acid homo- and copolymers have been suggested for use in hot melt adhesive compositions.

U.S. patent applications Ser. Nos. 812,887 filed July 5, 1977 and Ser. No. 826,491 filed Aug. 22, 1977 describe glycolic acid copolymers which are useful in hot melt adhesive compositions. Ser. No. 812,887 describes copolymers of lactones and glycolic acid or a glycolic acid homopolymers. Ser. No. 826,941 describes terpolymers of either glycolic acid or a homopolymer of glycolic acid, a dihydric alcohol, and a dibasic acid. While these materials can be used to produce acceptable hot melt adhesive compositions, it has been found that at elevated temperatures the compositions lose stability and become unacceptable for some applications.

The loss of stability at elevated temperatures weakens the bond strength of the adhesives and allows the bonded materials to separate or "creep". Thus, the resistance of adhesive compositions to the loss of stability is called "creep resistance." The corrugated paper manufacturing industry has fairly definite limitations on the acceptable creep resistance of hot melt adhesives. Surprisingly, hot melt adhesives comprising glycolic acid polymers have generally failed the corrugated paper manufacturing specifications unless annealed after application or unless allowed to age before application. However, neither the annealing nor the aging steps are desirable if existing equipment is to be used. An alternative method of imparting increased creep resistance to hot melt adhesives comprising a glycolic acid polymer is essential to the commercial acceptance of these adhesives.

This invention concerns the discovery that, if minor amounts of silica are incorporated into hot melt adhesive compositions comprising a glycolic acid polymer, the creep resistance of the adhesive compositions is significantly increased. In fact, adhesive compositions which failed for use in the manufacture of corrugated paper have been improved by the incorporation of a minor amount of silica to the point where they easily pass the creep resistance requirements of that industry. Silica has been suggested for use as a filler in hot melt adhesives. Suggested amounts range from 1% to 150% by weight. For instance, U.S. Pat. No. 4,031,058 describes hot melt sealants comprising a blend of a partially neutralized random copolymer ethylene/methyl acrylate/maleic acid monoethyl ester, with a tackifying agent, a plasticizer, and a filler. The filler comprises from about 10% to 50% by weight of the composition and may be carbon black, calcium carbonate, titanium dioxide, clays, or silica. U.S. Pat. No. 3,657,389 describes hot melt adhesive compositions comprising polyesters blended with polyolefins or vinyl polymers. The crystalline polyesters are preferred to amorphous polyesters since the crystalline polyesters are useful at higher temperatures. These compositions optionally include fillers to improve temperature resistance. Suitable fillers include silica, alumina, or calcium carbonate, all of which affect the degree of crystallinity and crystal size of the polyesters.

SUMMARY OF THE INVENTION

It has been discovered that hot melt adhesive compositions comprising from about 99.9% to about 90% by weight of a glycolic acid polymer, and from about 0.1% to about 10% by weight of silica have significantly improved thermal stability relative to comparable compositions prepared without the silica component.

DETAILED DESCRIPTION OF THE INVENTION

The hot melt adhesive composition provided by this invention is based upon the surprising cooperation of a glycolic acid polymer and silica which results in an adhesive composition having superior high temperature creep resistance. The cooperation between the glycolic acid polymer component and the silica component is particularly suprising since it has also been found that other finely divided materials such as calcium carbonate and talc at equivalent concentrations do not improve high temperature resistance of adhesives comprising a glycolic acid polymer. Thus, the compositions of this invention comprise two critical ingredients, that is, a glycolic acid polymer and silica.

Glycolic acid homo- and copolymers are suitable for use in the composition of this invention. Such polymers can be prepared by standard polymerization methods. As used herein, the term "glycolic acid homopolymer" includes the cyclic glycolide dimer and linear condensation polymers of the acid. Glycolide can be represented by the structure

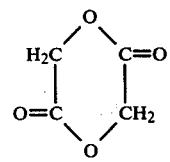

and is prepared by the pyrolytic dehydration of glycolic acid. U.S. Pat. No. 2,668,162 reports a 93% yield of glycolide by this method.

The linear homopolymers of glycolic acid can be represented by the formula

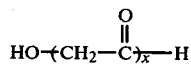

wherein x is the degree of polymerization and is preferably greater than 3. The glycolic acid linear homopolymers are prepared by conventional ring-opening polymerization of glycolide or by direct polycondensation of glycolic acid. U.S. Pat. Nos. 2,676,945 and 2,585,427 describe the direct polycondensation of glycolic acid.

As used herein the term "glycolic acid copolymer" includes the polyester condensation polymers produced by contacting glycolic acid, glycolic acid homopolymers, glycolic acid esters, or mixtures thereof with a copolymerizable material such as a hydroxyl, amino, carboxyl, epoxy, peroxy, or unsaturated compound. In general, glycolic acid copolymers comprise at least about 80 mol percent of glycolic acid, usually from about 90 mol percent to about 99 mol percent. Blends of two or more glycolic acid polymers may also be used in the composition of this invention. Preferred copolymers are described in U.S. patent applications Ser. No. 812,887 and Ser. No. 826,491, filed July 5, 1977, respectively. The disclosures of these two applications are incorporated herein by reference.

The copolymers described by Ser. No. 812,887 are polyester condensation copolymers produced by heating a mixture of from about 1 to about 40 parts by weight of a lactone containing at least 5 carbon atoms and from about 99 to about 60 parts by weight of glycolic acid, glycolic acid homopolymer, or mixtures thereof. The lactone copolymers vary widely in composition. They may contain as little as 1% by weight lactone, or as much as 40% by weight lactone. In general, as lactone content is increased the flexibility of the copolymer increases and the melting point decreases. Further, the molecular weight of the copolymer, that is, the degree of copolymerization, may vary depending upon the particular lactone being copolymerized as well as the particular conditions of copolymerization. For instance, it has been found that glycolide will copolymerize with epsilon-caprolactone to form high-molecular-weight copolymers. However, high concentrations of catalyst tend to lower the molecular weight of the copolymer. Copolymers of glycolide and pivalolactone or delta-valerolactone were lower molecular weight than copolymers of glycolide and epsilon-caprolactone.

In general, the lactone copolymers have a molecular weight between about 10,000 and about 300,000 although molecular weights above and below this range have been observed. The copolymers have reactive thermal hydroxy or carboxy groups and are characterized by a series of interconnected, substantially linear units. Typical copolymers are represented by the formula

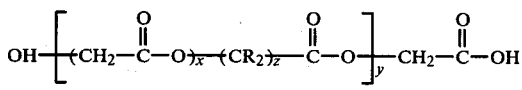

in which the lactone and glycolyl units are in random distribution. Various structures and distributions can be obtained, depending upon the monomers involved and conditions of copolymerization.

The copolymers of Ser. No. 826,491 are flexible glycolic acid terpolymers prepared by heating glycolic acid, its esters, its homopolymers or mixtures thereof with a dihydroxyalkane and a dibasic acid.

The glycolic terpolymers also vary widely in composition. They may contain as little as about 1% by weight of the diacid or as much as about 40%. Similarly, they may contain from about 1 to about 40% by weight of the dihydroxyalkane. Preferably the diacid and dihydroxyalkane are present in equimolar quantities. However, for low acid number terpolymers, i.e., a preponderance of the terpolymerization product being terpolymers terminated by hydroxyl groups, an excess of the dihydroxyalkane relative to dibasic acid should be used, for example, up to about 10 mol percent excess in the product. Because some low molecular weight glycol is lost due to volatilization during polymerization, the charge to the reaction vessel may have as much as 30% excess of glycol to compensate for this loss. In general, as the diacid and dihydroxyalkane content is increased the flexibility of the resultant terpolymer also increases. The terpolymers typically have a molecular weight between about 2000 and 70,000. As the reaction time and temperature are increased, molecular weight also increases. Typical terpolymers favor the structure

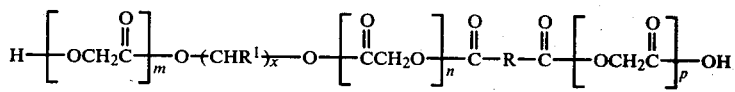

Wherein R, $R^1$ and x are as defined previously and m, n and p are determined by the conditions of polymerization and relative monomer concentrations. Thus, the polyester condensation terpolymers will typically have a block structure which could generally be called a polyglycolic acid randomly interspersed by dihydroxyalkane or dibasic acid moieties. Other structures are also possible.

Particularly preferred glycolic acid copolymers described by Ser. No. 822,491 are modified to provide high molecular weight, slightly cross-linked or branched flexible polymers by substituting a minor amount of polyol for some of the dihydroxyalkane. Thus, in a preferred embodiment, minor amounts of polyols having more than two hydroxyl groups are used in addition to a major amount of dihydroxyalkane. From about 2 to about 2.2 equivalents of total hydroxy groups are preferably employed per mol of dibasic acid. The total number of equivalents of hydroxyl groups is determined by multiplying the number of hydroxyl groups in a molecule by the number of mols of that hydroxyl-containing compound present and summing up for all hydroxyl-containing compounds in the feedstock. For example, a 20/80 molar mixture of trihydroxyalkane/dihydroxyalkane would have:

$20 \times 3 + 80 \times 2 = 60 + 160 = 220$ equivalents of hydroxy and would require from 100 to 110 mols of a dicarboxylic acid, i.e., 200 to 220 equivalents of carboxyl groups.

The polymers which are formed by polycondensation of glycolic acid, its homopolymer, esters, or mixtures thereof with a dibasic acid, a dihydroxyalkane, and a polyol are slightly crosslinked or branched through the polyol unit of the polymer which increases the molecular weight of the polymer and improves flexibility.

The second critical component of the composition of this invention is a finely divided silica. Silica, or silicon dioxide, or silicic acid anhydride, occurs abundantly in nature and exists in seven crystalline forms. Any of these forms may be used in the composition of this invention if processed in finely divided particles. Suitable particulate silicas have an average diameter of from about 0.001 to about 0.1 microns, preferably from about 0.005 to about 0.01 microns, and a surface area of from about 10 square meters per gram ($m^2/g$) to about 1000 $m^2/g$, preferably from about 100 to about 500 $m^2/g$.

A particularly preferred silica is marketed by the Cabot Corporation under the registered tradename Cab-O-Sil. Cab-O-Sil is a fire dried fumed silica having a surface area from about 200 $m^2/g$ to about 400 $m^2/g$, an average particle size in the range of 0.007 to 0.014 microns, and a refractive index of about 1.46.

The composition of this invention can be prepared in several ways including mechanical mixing, hot roll blending, melt mixing, or mixing in solution. For instance, the silica component can be added to the glycolic acid polymer component, preferably at slightly elevated temperature, and mechanically dispersed. In a preferred embodiment, the silica component is added to the mixture of monomers selected for use in preparing the glycolic acid polymer, and is dispersed during polymerization. This method is especially preferred where less than about 5% by weight of silica is being added. In general, the composition will comprise at least about 0.1% by weight of the silica component and at least about 90% by weight of the polymer component. Preferably the composition will comprise from about 1% to about 5% by weight silica component and from about 99% to about 95% by weight polymer component. A particularly preferred composition comprises about 4% by weight silica and about 96% by weight polymer.

In addition to the silica components and the polymer component, the composition of this invention may comprise various nonessential adjuvants. For instance, the composition may comprise other polymers such as copolymers of olefins like polystyrene, polyethylene, or polyisobutylene. The hard, rigid polyolefins such as polystyrene are useful for the production of melt adhesives that are required to retain their bond strength at relatively high temperatures. Softer types such as polyethylene and polyisobutylene are useful for improving the flow properties of the blend and also for improving the low temperature adhesive properties. Typical examples of suitable polyolefins include polystyrene, and substituted styrene polymers such as poly(alphamethylstyrene), poly(p-chlorostyrene), polyethylene, polypropylene, polybutene-1, poly(vinylcyclohexane), poly(4-methylpentene), and poly(allylbenzene). Polystyrene and other polymers of styrene containing up to about 50 weight percent styrene are particularly useful in this invention. The polymers may be of the amorphous type or they may be stereoregular types. Other olefin-type polymers which may be used are listed in U.S. Pat. No. 3,239,582, column 2, lines 10–47. Mixtures of polyolefins can be used in this invention.

Copolymers of olefins are also useful as represented by styrene-ethylene, styrene-butylene, propylene-ethylene, butylene-ethylene, etc. Copolymers of olefins with other types of monomers are useful, as represented by ethylene-vinyl acetate, ethylene-methyl acrylate, styrene-acrylic acid, etc.

Fillers, pigments, antioxidants, stabilizers and fabrics may also be incorporated into the composition of this invention to improve color, texture or thermal and oxidative stability. Materials which may be bonded by the adhesives of this invention include paper, cardboard, metals (such as steel, iron, aluminum, chromium, copper, brass, bronze, nickel, zinc, titanium, and tin), wood, glass, ceramics, and fabrics. The fabrics may be natural or synthetic fibers or blends of fibers, including cotton, wool, silk, polyesters, polyamides, cellulose esters, regenerated cellulose, and acrylics. The same or different materials may be laminated in one structure. In general, it is advisable to clean the surfaces of the components to be laminated prior to formation of the melt adhesive bonds to remove foreign matter, such as grease or oxide coating, which might interfere with the formation of a strong bond. As discussed hereinabove, the adhesives of this composition are particularly useful in applications which require resistance to creep under elevated temperature conditions.

The adhesive may be applied to molten form with a spatula or regular extrusion equipment to the surfaces of the components to be laminated. If the glycolic acid polymer is soluble in a volatile solvent, such as chloroform, it may be applied as a dope and the solid allowed to evaporate. Or a film of the adhesive may be placed between the surfaces, and subjected to pressure and heat above the softening range of the material.

EXAMPLES

The following examples illustrate the preparation and properties of several embodiments of the composition of this invention. Other embodiments are also encompassed by the invention and accordingly the examples do not limit its scope.

EXAMPLES 1–4

Silica Modified Glycolic Acid Copolymer

Four silica modified glycolic acid copolymers were prepared by mixing 1%, 2%, 4%, and 5% by weight of silica and a previously prepared glycolic acid copolymer. The silica, Cab-O-Sil M-5 ®, was obtained from the Cabot Corporation. It is reported to have a nominal particle size from 0.007 to 0.014 microns and a surface area of 200 to 400 $m^2/g$.

The glycolic acid copolymer was prepared by mixing 371 grams of glycolic acid (4.875 M), 16.75 grams of diglycolic acid (0.125 M), 7 grams of ethylene glycol (0.0115 M), and 2.1 grams of trimethylolethane (0.0175 M) in a 500 milliliter flask equipped with a short distillation head, a nitrogen capillary, and an oil bath. The mixture was heated to 218° C. for one hour at atmospheric pressure, two hours at 150 mm and two hours at 0.3 millimeters mercury. 271.12 grams of product were removed from the flask. 265.80 g of the recovered product was ground into fine particles, and heated at 150° C. for 96 hours at 0.3 millimeters mercury. 221.74 grams of polymer were recovered. The polymer had a molecular weight of about 13,000.

The four silica modified copolymers were prepared by mixing about 40 grams of copolymer with from 0.4 gram (1%) to 2.0 grams (5%) of silica in a Brabender Mixer. Mixing was carried out at about 220° C. for 2.5 minutes at a mixer speed of 180 rpm. Each of the four copolymers passed an accepted creep resistance test.

For comparative purposes, a sample of the glycolic acid copolymer which was not modified by silica; and samples of the copolymer modified by the incorporation of 1% talc, 1% graphite, 1% calcium carbonate, 5% talc, 5% graphite, and 5% calcium carbonate were also tested. None of these compositions passed the creep resistance test.

EXAMPLE 5

Silica Modified Glycolic Acid Copolymer

In this Example, a silica modified glycolic acid copolymer was prepared, in situ, by mixing 74.2 grams of glycolic acid (0.975 M), 3.35 grams of diglycolic acid (0.025 M), 1.4 grams of ethylene glycol (0.023 M), 0.42 gram (0.0035 M) of trimethylolethane, and 0.50 gram of Cab-O-Sil M-5 ® in a 100 milliliter flask equipped with a short distillation head, a nitrogen capillary, and an oil bath. The mixture was heated at 218° C. for one hour at atmospheric pressure, one hour at 150 mm, and one hour at 0.3 millimeters mercury. The recovered product was ground and heated at 150° C. for 96 hours at 0.3 millimeters mercury. The resulting polymer had a molecular weight of about 34,000. The polymer, comprising 1.8% by weight silica, easily passed an accepted creep resistance test.

EXAMPLES 6–7

Silica Modified Glycolic Acid Homopolymer

Two silica modified glycolic acid homopolymers were prepared by mixing 1% by weight of silica and a previously prepared glycolic acid homopolymer. The silica was Cap-O-Sil M-5 ®.

The glycolic acid homopolymer was prepared by heating 304.2 grams of glycolic acid at a temperature of 218° C. for one hour at atmospheric pressure, one hour at 150 mm, and one hour at 0.3 millimeters mercury. The product was ground and heated at 150° C. for 96 hours at 0.3 millimeter mercury.

The two silica modified homopolymers were prepared by mixing each of two 40 gram aliquots of homopolymer with 0.4 gram of silica. Both samples easily passed an accepted creep resistance test.

What is claimed is:

1. A composition useful as a hot melt adhesive comprising a polymer of glycolic acid and from about 0.1% to about 10% by weight of particulate silica to improve the thermal stability of said polymer.

2. A composition according to claim 1 wherein the polymer of glycolic acid is a glycolic acid homopolymer.

3. A composition according to claim 2 wherein the polymer of glycolic acid is glycolide.

4. A composition according to claim 2 wherein the polymer of glycolic acid is a linear condensation homopolymer of glycolic acid.

5. A composition according to claim 1 wherein the polymer of glycolic acid is a glycolic acid copolymer.

6. A composition according to claim 5 wherein the copolymer of glycolic acid comprises at least about 80 mol percent of glycolic acid.

7. A composition according to claim 6 wherein the copolymer of glycolic acid comprises from about 90 mol percent to about 99 mol percent of glycolic acid.

8. A composition according to claim 5 wherein the glycolic acid copolymer comprises a lactone containing at least 5 carbon atoms.

9. A composition according to claim 5 wherein the glycolic acid copolymer comprises a mixture of a dihydroxyalkane and a dibasic acid.

10. A composition according to claim 9 wherein the glycolic acid copolymer comprises from about 1% to about 40% by weight of the dihydroxyalkane and from about 1% to about 40% by weight of the dibasic acid.

11. A composition according to claim 10 wherein the dihydroxyalkane and dibasic acid are present in an equimolar amount.

12. A composition according to claim 10 wherein the dihydroxyalkane is present in an amount of about a 10% molar excess relative to the dibasic acid.

13. A composition according to claim 9 wherein the glycolic acid copolymer comprises a minor amount of a polyol.

14. A composition according to claim 9 wherein the dihydroxyalkane is selected from diols containing 2 to 14 carbon atoms, and the dibasic acid is selected from the aliphatic diacids containing 2 to 14 carbon atoms and the aromatic diacids containing 6 to 12 carbon atoms.

15. A composition according to claim 14 wherein the diacid is selected from the group consisting of ethanedioic acid, propanedioic acid, butanedioic acid, hexandioic acid, pentanedioic acid, pimelic acid, suberic acid, azelaic acid, diglycolic acid, and sebacic acid.

16. A composition according to claim 14 wherein the dihydroxyalkane is selected from a group consisting of 1,2- and 1,3- glycols.

17. A composition useful as a hot melt adhesive comprising from about 99 mol percent to about 90 mol percent of glycolic acid; from about 1 mol percent to about 10 mol percent of adipic acid, ethylene glycol, and 1,1,1-trimethylolethane wherein the molar amount of adipic acid is equivalent to the combined molar amounts of ethylene glycol and trimethylolethane and the mol ratio of ethylene glycol to trimethylolethane is from about 10:1 to about 5:1; and from about 0.1% to about 10% by weight of silica.

18. A composition according to claim 17 wherein the particles of silica have an average diameter of from about 0.001 to about 0.1 microns and an average surface area of from about 10 to about 1000 $m^2$/gram.

19. A composition according to claim 18 wherein the particles of silica have an average surface area of from about 100 $m^2$/g to about 500 $m^2$/g.

20. A composition according to claim 1 wherein the particles of silica have an average diameter of from about 0.001 to about 0.1 micron and an average surface area of from about 10 to about 1000 $m^2$/g.

21. A composition according to claim 20 wherein the particles of silica have an average surface area of from about 100 $m^2$/g to about 500 $m^2$/g.

22. A method of bonding two or more paper surfaces comprising applying the composition of claim 1 to at least one of the surfaces to be bonded, and contacting the surfaces.

23. A method of bonding two or more paper surfaces comprising applying the composition of claim 19 to at least one of the surfaces to be bonded, and contacting the surfaces.

* * * * *

UNITED STATES PATENT AND TRADEMARK OFFICE
CERTIFICATE OF CORRECTION

PATENT NO. : 4,156,676
DATED : May 29, 1979
INVENTOR(S) : ROBERT BACSKAI

It is certified that error appears in the above-identified patent and that said Letters Patent are hereby corrected as shown below:

Column 3, line 3, " $-C)$ " should read -- $-\overset{O}{\underset{\|}{C}}-O)$ --.

Column 3, line 23, "1977," should read --1977, and August 22, 1977--.

Column 7, line 33, "Cap-O-Sil" should read --Cab-O-Sil--.

Signed and Sealed this

Eleventh Day of September 1979

[SEAL]

Attest:

LUTRELLE F. PARKER

Attesting Officer

Acting Commissioner of Patents and Trademarks